June 25, 1929.  H. BANY  1,718,517
SYSTEM OF ELECTRIC DISTRIBUTION
Filed Jan. 19, 1928
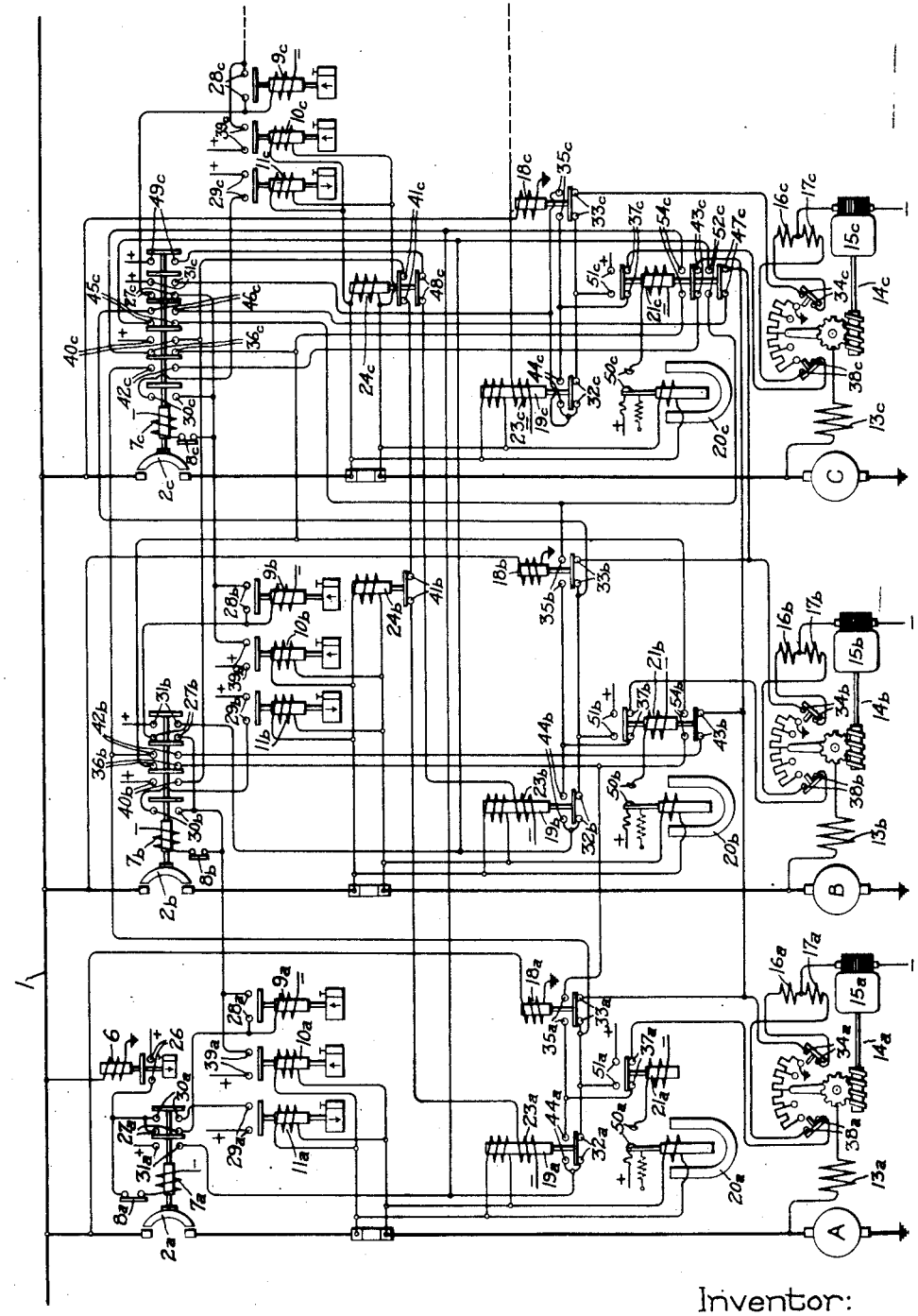
Inventor:
Herman Bany,
by
His Attorney.

Patented June 25, 1929.

1,718,517

UNITED STATES PATENT OFFICE.

HERMAN BANY, OF YEADON, PENNSYLVANIA, ASSIGNOR TO GENERAL ELECTRIC COMPANY, A CORPORATION OF NEW YORK.

SYSTEM OF ELECTRIC DISTRIBUTION.

Application filed January 19, 1928. Serial No. 247,979.

My invention relates to electric distribution systems and particularly to a system in which a load circuit is supplied from a plurality of parallel connected sources and one of its objects is to provide an improved arrangement for controlling the division of load between the parallel connected sources.

Another object is to provide an improved arrangement for controlling the operation of the sources upon the occurrence of a reversal of power flow between a source and the load circuit.

It is customary in some systems of electric distribution to operate most of the sources connected to a load circuit at substantially full load and to vary the output of one or more of the sources so as to take care of the load variations. In such arrangements where the sources are arranged to be connected to and disconnected from the load circuit sequentially in order to take care of a wide range of load variations, the output of the last connected source of those in service is usually the one to be controlled in accordance with the load variations whereas the outputs of the preceding sources in the sequence are maintained at constant values. In accordance with my invention I provide an improved arrangement for causing the outputs of the sources connected to the load circuit to be regulated in such a manner as the number of sources in service is varied that the output of the last connected source of those in service is controlled in response to the load circuit voltage and the outputs of the other sources connected to the load circuit are maintained at constant values.

Furthermore with such an arrangement of load control, a large decrease in load may result in such an increase in the load circuit voltage and such a decrease in the excitation of the source whose output is being controlled in response to the load circuit voltage that this source receives power from the load circuit instead of supplying power thereto. In accordance with my invention I provide an arrangement for terminating the reversal and restoring the control of the ouput of one or more of the other sources to the load circuit voltage so that it may be quickly restored to normal.

My invention will be better understood from the following description taken in connection with the accompanying drawing and its scope will be pointed out in the appended claims.

In the accompanying drawing I have shown diagrammatically my invention in connection with an automatic control system which is normally arranged to connect sequentially a plurality of direct current generators to a common load circuit. In order to simplify the disclosure I have shown automatic switching means associated with each source for merely connecting it to the load circuit in response to the predetermined operation of a control device. In practice, however, it is to be understood that the operation of the control device may first effect the operation of suitable automatic devices, examples of which are well known in the art, for effecting the proper starting of each source before it is connected to the load circuit.

Referring to the particular embodiment of my invention shown in the drawing, A, B and C are three sources of current which are arranged to be connected to a common load circuit 1 in the order named by suitable switches $2^a$, $2^b$ and $2^c$ respectively. These sources may be of any suitable type examples of which are well known in the art and may be provided with any suitable regulating means for controlling the outputs thereof.

The sequential connection and disconnection of the sources may be effected in response to the operation of any suitable control devices, examples of which are well known in the art. In the particular embodiment shown in the drawing source A is normally arranged to be connected to the load circuit 1 when the load circuit voltage remains below a predetermined value for a predetermined time and to be disconnected when the current output of the source A remains below a predetermined value for a predetermined time. The source B is normally arranged to be connected to the load circuit 1 when either the output of the source A remains above a predetermined value for a predetermined time or the source A is not connected to the load circuit within a predetermined time after the starting indication therefore has been given. The source B is arranged to be disconnected from the load circuit when the current output thereof remains below a predetermined value for a predetermined time. The source C is normally arranged to be connected to the load circuit 1 when either the output of the source B remains above a predetermined value for a predetermined time or the source B is not connected to the load circuit within a predetermined time after the starting indication therefor has been given. The source C is arranged to be disconnected when the current output thereof remains below a predetermined value for a predetermined time.

For effecting the above described sequential operation a voltage responsive relay 6 is provided which is responsive to the load circuit voltage and which is arranged to complete a circuit for the closing coil $7^a$ of the switch $2^a$ when the load circuit voltage remains below a predetermined value for a predetermined time. The circuit of the closing coil $2^a$ is shown as having connected therein contacts $8^a$ of suitable protective devices (not shown) associated with the source A so that the source A cannot be connected to the load circuit if the source A is not in an operative condition. Examples of such protective devices are well known in the art. The voltage responsive relay 6 is also arranged to complete a circuit for a time relay $9^a$ at the same time it completes the circuit for the closing coil $7^a$. The closing of the switch $2^a$ is arranged to open the circuit of the time relay $9^a$. If, however, the switch $2^a$ fails to close within a predetermined time, time relay $9^a$ operates and effects the completion of a circuit for the closing coil $7^b$ of the switch $2^b$ so that source B is connected to the load circuit. The source A is provided with an overcurrent relay $10^a$ which is responsive to the current output of the source A and which is arranged to effect the energization of the closing coil $7^b$ of the switch $2^b$ when the current output of source A remains above a predetermined value for a predetermined time. The source A is also provided with an undercurrent relay $11^a$ which is responsive to the current output of the source and which is arranged to effect the opening of the switch $2^a$ when the current output of the source A remains below a predetermined value for a predetermined time.

The sources B and C are respectively provided with similar protective contacts $8^b$ and $8^c$, time relays $9^b$ and $9^c$, over-current relays $10^b$ and $10^c$ and under-current relays $11^b$ and $11^c$ for controlling the connection of the associated sources and the succeeding sources.

As shown in the drawing the sources A, B and C are direct current generators which are provided with shunt field windings $13^a$, $13^b$, and $13^c$ respectively. The outputs of the sources A, B and C respectively are controlled by varying the excitation of the field winding $13^a$, $13^b$ and $13^c$ by means of suitable motor operated rheostats $14^a$, $14^b$ and $14^c$. As shown, the rheostats $14^a$, $14^b$ and $14^c$ are respectively operated by reversible motors $15^a$, $15^b$ and $15^c$ which are respectively provided with the differential field windings $16^a$ and $17^a$, $16^b$ and $17^b$, and $16^c$ and $17^c$. These differential field windings are so connected and arranged that when the circuit of any one of the field windings $16^a$, $16^b$ and $16^c$ is completed, the associated rheostat is operated to decrease the amount of resistance in the associated field circuit and when the circuit of any one of the field windings $17^a$, $17^b$ and $17^c$ is completed the associated rheostat is operated to increase the amount of resistance in the associated field circuit.

For controlling the operation of the rheostats $14^a$, $14^b$ and $14^c$, the generators A, B and C have associated therewith the voltage regulating relays $18^a$, $18^b$ and $18^c$ respectively which are responsive to the voltage of the load circuit, the current regulating relays $19^a$, $19^b$ and $19^c$ respectively which are responsive to the current outputs of the respective sources, and the current directional relays $20^a$, $20^b$ and $20^c$ respectively and the control relays $21^a$, $21^b$ and $21^c$ respectively which operate in accordance with the direction of current flow between the respective sources and the load circuit. These control devices are arranged in a manner which will be more fully explained hereinafter so that when any source is the only source in operation or is the last connected source and current is flowing from the source to the load circuit its associated voltage regulating relay controls the operation of the associated field rheostat until the current output of the source reaches a predetermined value when the associated current regulating relay assumes control of the associated rheostat and prevents the voltage regulating relay from increasing the output of the source above a predetermined value. When any source is in operation but is not the last one connected to the load circuit 1, the associated voltage regulating relay is prevented from controlling the associated rheostat and the operation thereof is under the control of the current regulating relay so that the output of the source is maintained constant at a predetermined value.

Whenever a predetermined current reversal occurs between a source and the load circuit, it is desirable to terminate the reversal as soon as possible and this result is accomplished by means of the associated current directional relay and its associated control relay which are arranged to cooperate with the associated voltage regulating relay so as to increase the excitation of the source if the load circuit voltage is below normal. Each current directional relay and its associated control relay are also arranged to restore to the associated voltage regulating relay the control of the rheostat of another source which prior to the reversal was under the control of its associated current regulating relay. For example assume that the sources A, B and C are in operation and that the rheostats 14$^a$ and 14$^b$ are under the control of the current regulating relays 19$^a$ and 19$^b$ respectively so that the current outputs of the sources A and B are being maintained at predetermined values and that the rheostat 14$^c$ is under the control of the voltage regulating relay 18$^c$ so that the output of the source C is being varied automatically to take care of load variations. If under these conditions the current between the source C and the load circuit 1 reverses the relays 20$^c$ and 21$^c$ operate to restore the control of the rheostat 14$^b$ to the control of voltage regulating relay 18$^b$ and to effect an increase in the excitation of source C if the load circuit voltage is below normal.

In order that each source when it is first connected to the load circuit may supply sufficient current so that its associated undercurrent relay will not effect its immediate disconnection the current regulating relays 19$^a$, 19$^b$ and 19$^c$ are provided with auxiliary windings 23$^a$, 23$^b$ and 23$^c$ respectively, which when energized change in any suitable manner the calibration of the associated relay so that it responds to a lower value of load current of the associated source than when the associated auxiliary winding is not energized. As shown in the drawing the windings 23$^a$, 23$^b$ and 23$^c$ are arranged to be energized when the next succeeding operative source is connected to the load circuit and the output thereof is below a predetermined value. For example the winding 23$^a$ is arranged to be energized when the source B is connected to the load circuit and the output thereof is less than a predetermined value so that the contacts of a load responsive relay 24$^b$ associated therewith are closed. If the source B is not connected to the load circuit but the source C is, the winding 23$^a$ is also arranged to be energized when the output of source C is less than a predetermined value so that the contacts of the load responsive relay 24$^c$ associated therewith are closed. The winding 23$^b$ is similarly arranged to be energized when switch 7$^c$ is closed and the output of the source C is less than a certain value so that the contacts of the load responsive relay 24$^c$ are closed. The winding 23$^c$ would be energized in response to the connection of the next source in the sequence if such a source were provided and the output thereof was below a predetermined value.

The operation of the arrangement shown in the drawing is as follows: It will be assumed that the sources A, B and C are disconnected from the load circuit 1 which is energized by other sources (not shown) and that the voltage of the load circuit 1 decreases to such a value and remains at this subnormal value for a sufficient time to permit voltage responsive relay 6 to close its contacts 26. A circuit is then completed for the closing coil 7$^a$ of the switch 2$^a$ through contacts 26 and protective contacts 8$^a$. If the source A is in an operative condition so that the contacts 8$^a$ are closed, the switch 2$^a$ closes and connects the source A to the load circuit. Any suitable means, examples of which are well known in the art, may be provided for insuring that the voltage of the source A is at the proper value at the time it is connected to the load circuit.

The closing of the relay contacts 26 also completed through auxiliary contacts 27$^a$ on the switch 2$^a$ a circuit for the time relay 9$^a$ which is arranged to close its contacts 28$^a$ and complete a circuit for the closing coil 7$^b$ of switch 2$^b$ if the switch 2$^a$ does not close within a predetermined time after the contacts 26 close. If the switch 2$^a$ closes within the predetermined time the circuit of time relay 9$^a$ is opened at contacts 27$^a$.

As soon as the switch 2$^a$ closes current flows from the source A to the load circuit and causes undercurrent relay 11$^a$ to close its contacts 29$^a$ thereby completing through auxiliary contacts 30$^a$ on switch 2$^a$ a holding circuit for closing coil 7$^a$ which is independent of contacts 26 so that the switch 2$^a$ is not opened by the subsequent opening of contacts 26 when the load circuit voltage is restored to normal.

The switch 2$^a$ by closing its auxiliary contacts 31$^a$ places the control of rheostat 14$^a$ under the control of the voltage regulating relay 18$^a$ and the current regulating relay 19$^a$. If the load circuit voltage is below normal a circuit is completed for motor 15$^a$ through field winding 16$^a$ to increase the excitation of source A. This circuit is from one side of a suitable source through auxiliary contacts 31$^a$ on switch 2$^a$, contacts 32$^a$ of relay 19$^a$, contacts 33$^a$, limit switch 34$^a$, field winding 16$^a$, armature of motor 15$^a$ to the other side of the control. It will be noted that the current output of the source A has to be less than a predetermined value so that contacts 32$^a$ are closed in order for relay 18$^a$ normally to increase the excitation of source A. If the load circuit voltage is above normal, relay 18$^a$ closes its contacts 35$^a$ and completes a circuit for motor 15$^a$ through field winding 17$^a$ to decrease the excitation of source A. This circuit is from one side of the control source, through auxiliary contacts 31$^a$ on switch 2$^a$, auxiliary contacts 36$^c$ on switch 2$^a$, auxiliary contacts 36$^b$ on switch 2$^b$, contacts 35$^a$ of relay 18$^a$, contacts 37$^a$ of control relay 21$^a$, limit switch 38$^a$, field winding 17$^a$, armature of motor 15$^a$ to the other side of the control circuit. It will be noted that normally the voltage regulating relay 18$^a$ is operative to effect a decrease in the excitation of the source A only when all of the subsequent sources in the predetermined sequence are disconnected from the load circuit.

If the current output of the source A exceeds a predetermined value the current regulating relay $19^a$ opens its contacts $32^a$, thereby preventing the voltage regulating relay $18^a$ from effecting an increase in the excitation of the source A, and closes its contacts $44^a$ thereby completing through contacts $31^a$, and $37^a$ and limit switch $38^a$ a circuit for the motor $15^a$ so that the excitation of the source A is decreased until the current output thereof is reduced to a value which will cause relay $19^a$ to open its contacts $44^a$. Current regulating relay $19^a$ therefore operates to maintain the current output of the source below a predetermined value.

If the current output of the source A remains above a predetermined value for a certain time, this current value being usually slightly lower than the value at which the current regulating relay $19^a$ operates when its winding $23^a$ is not energized, overcurrent relay $10^a$ closes its contacts $39^a$ and thereby completes a circuit for the closing coil $7^b$ of switch $2^b$ to effect the connection of the source B to the load circuit 1. This circuit is from one side of the control circuit through contacts $39^a$ of relay $10^a$, protective contacts $8^b$, closing coil $7^b$ to the other side of the control circuit. At the same time a circuit is completed for the time relay $9^b$ so that this relay can effect the operation of the switch $2^c$ if the switch $2^b$ is not closed within a predetermined time after the contacts $39^a$ are closed. This latter circuit is from one side of the control circuit through contacts $39^a$, auxiliary contacts $27^b$ on switch $2^b$, coil of relay $9^b$ to the other side of the control circuit. If the switch $2^b$ closes within the predetermined time the relay $9^b$ is rendered inoperative to effect the closing of the switch $2^c$.

As soon as the switch $2^b$ closes current flows from the source B to the load circuit 1. Any suitable means, examples of which are well known in the art, may be provided for insuring that the voltage of the source B is at the proper value to accomplish this result when it is connected to the load circuit. This flow of current causes the undercurrent relay $11^b$ to close its contacts $29^b$ so that a locking circuit which is independent of contacts $39^a$ of overcurrent relay $10^a$ is completed for the closing coil $7^b$. This locking circuit also includes auxiliary contacts $30^b$ on the switch $2^b$. In order to insure that sufficient current flows from the source B to the load circuit to operate the relay $11^b$, the closing of the switch $2^b$ is arranged to complete a circuit for the auxiliary winding $23^a$ of current regulating relay $19^a$. This circuit is from one side of the control circuit through auxiliary contacts $40^b$ on switch $2^b$, contacts $41^c$ of load responsive relay $24^c$, contacts $41^b$ of load responsive relay $24^b$, winding $23^a$ to the other side of the control circuit. The two windings of the current responsive relay are wound accummulatively so that when the winding $23^a$ is energized less current is required through the other winding to cause the relay to operate. Therefore, when the winding $23^a$ is energized by the closing of switch $2^b$, the output of source A is reduced a certain amount so that source B will supply sufficient current to insure that relay $11^b$ will operate. When the load increases to such a value that the output of the source A may be restored to its normal operating value, load responsive relay $24^b$ opens its contacts $41^b$ thereby deenergizing winding $23^a$ and causing relay $19^a$ to readjust the output of the source A to the normal operating value. It will be noted that switch $2^b$ by opening its contacts $36^b$ prevents the voltage regulating relay $18^a$ from effecting a decrease in the excitation of the source A. In order that the current regulating relay $19^a$ may effect an increase in the output of source A while the load circuit voltage is normal after the switch $2^b$ is closed, the switch $2^b$ when closed completes through its auxiliary contact $42^b$ a shunt circuit around contacts $33^a$ of relay $18^a$. This shunt circuit also includes contacts $43^b$ of relay $21^b$. Therefore it will be noted that after switch $2^b$ is closed the voltage regulating relay $18^a$ normally does not control the operation of the rheostat $14^a$, but that the rheostat is under the control of the current regulating relay $19^a$.

After the switch $2^b$ closes the operation of the rheostat $14^b$ is controlled by the voltage regulating relay $18^b$ and current regulating relay $19^b$ in exactly the same way that the rheostat $14^a$ is controlled by the relay $18^a$ and $19^a$ when the source A is the only source in service. If the load circuit voltage is below normal a circuit is completed through auxiliary contacts $31^b$ on switch $2^b$, contacts $32^b$ of current regulating relay $19^b$, contacts $33^b$ of voltage regulating relay $18^b$, limit switch $34^b$; field winding $16^b$ and armature of motor $15^b$ to cause the motor to adjust the rheostat $14^b$ so that the current output of the source B is increased to restore the voltage to normal. If the load circuit voltage is above normal a circuit for winding $17^b$ of motor $15^b$ is completed so that the rheostat $14^b$ is adjusted to decrease the output of the source B. This circuit also includes the limit switch $38^b$, contacts $37^b$ of relay $21^b$, contacts $35^b$ of relay $18^b$, auxiliary contacts $45^c$ of switch $2^c$ and auxiliary contacts $31^b$ on switch $2^b$. Voltage regulating relay $18^b$ therefore is normally arranged to effect a decrease in the excitation of source B only when it is the last source connected to the load circuit. If the current output of the source B tends to exceed a predetermind value, current regulating relay $19^b$ operates to open its contacts $32^b$ and close its contacts $44^b$ so that a circuit is completed through winding $17^b$ of motor 15$^b$ to cause the rheostat 14$^b$ to be adjusted in such a manner that the excitation of the source B is decreased.

When the current output of the source B exceeds a predetermined amount for a predetermined time overcurrent relay 10$^b$ closes its contacts 39$^b$ and completes a circuit for the closing coil 7$^c$ of switch 2$^c$ so that the source C is connected to the load circuit 1. This circuit also includes protective contacts 8$^c$ so that the switch 2$^c$ is not closed if the source C is not in an operative condition. The closing of contacts 39$^b$ also completed through auxiliary contacts 27$^c$ a circuit for time relay 9$^c$, which would be arranged, if there were a fourth source, to effect the connection of this fourth source if the switch 2$^c$ did not close within a predetermined time after the contacts 39$^b$ are closed.

Switch 2$^c$ by opening its auxiliary contacts 45$^c$ prevents the voltage regulating relay 18$^b$ from normally controlling the rheostat 14$^b$ so as to decrease the excitation of the source B. Switch 2$^c$ by closing its contacts 46$^c$ completes through contacts 47$^c$ a shunt circuit around contacts 33$^b$ of the voltage regulating relay 18$^b$. Therefore after the switch 2$^c$ closes the rheostat 14$^b$ is under the control of the current regulating relay 19$^b$ so that the current output of the source B is maintained at a predetermined value. As soon as the switch 2$^c$ closes a circuit is completed through auxiliary contacts 49$^c$ on the switch and contacts 48$^c$ of relay 24$^c$ for the auxiliary winding 23$^b$ of the current regulating relay 19$^b$ so that until the current output of the source C is sufficient to operate the load responsive relay 24$^c$ the current regulating relay 19$^b$ maintains the current output constant at a value below the normal operating value.

As soon as the switch 2$^c$ closes, undercurrent relay 11$^c$ closes its contacts 29$^c$ which complete through auxiliary contacts 30$^c$ a holding circuit for the closing coil 7$^c$ which is independent of the contacts 39$^b$ of relay 10$^b$.

The closing of the auxiliary contacts 31$^c$ on the switch 2$^c$ places the control of the rheostat 14$^c$ under the control of the voltage regulating relay 18$^c$ and the current regulating relay 19$^c$ so that the excitation of the source C is regulated in response to the load circuit voltage until the current output reaches a predetermined value and then the current regulating relay 19$^c$ operates to prevent the current output exceeding this predetermined value. When the load circuit voltage is below normal contacts 33$^c$ complete a circuit for motor 15$^c$ so that the rheostat 14$^c$ is adjusted to increase the excitation of the source C. This circuit also includes the contacts 31$^c$, contacts 32$^c$ of relay 19$^c$, limit switch 34$^c$, field winding 16$^c$ and armature of motor 15$^c$. When the load circuit voltage is above normal, contacts 35$^c$ complete a circuit for motor 15$^c$ so that the rheostat 14$^c$ is adjusted to decrease the excitation of the source C. This circuit also includes the contacts 31$^c$, contacts 37$^c$ of relay 21$^c$, limit switch 38$^c$, field winding 17$^c$ and armature of motor 15$^c$. Relay 19$^c$ by closing its contacts 44$^c$ when the current output of source C exceeds a predetermined amount also completes a circuit for the motor 15$^c$ to adjust the rheostat so as to decrease the excitation of the source C.

If the switch 2$^a$ fails to close for any reason within a predetermined time after the closing of the contacts 26 of the voltage responsive relay 6, the time relay 9$^a$ closes its contacts 28$^a$ and completes a circuit for the closing coil 7$^b$ of the switch 2$^b$ so that the source B is connected to the load circuit instead of source A. This circuit is from one side of the control circuit through contacts 26 of relay 6, auxiliary contacts 27$^a$ on switch 2$^a$, contacts 28$^a$ of relay 9$^a$, protective contacts 8$^b$, closing coil 7$^b$ to the other side of the control circuit.

Similarly if the switch 2$^b$ fails to close within a predetermined time after the closing of either contacts 39$^a$ of relay 10$^a$ or contacts 28$^a$ of time relay 9$^a$, time relay 9$^b$ closes its contacts 28$^b$ and a circuit for the closing coil 7$^c$ is completed to effect the connection of the source C to the load circuit. If both of the switches 2$^a$ and 2$^b$ have failed to close in response to the closing of contacts 26 of relay 6 so that both of the relays 9$^a$ and 9$^b$ are operated the circuit for the closing coil 7$^c$ is from one side of the control circuit through contacts 26 of relay 6, auxiliary contact 27$^a$ on switch 2$^a$, contacts 28$^a$ of relay 9$^a$, auxiliary contacts 27$^b$ on switch 2$^b$, contacts 28$^b$ of relay 9$^b$, protective contacts 8$^c$, closing coil 7$^c$ to the other side of the control circuit. If the switch 2$^a$ is closed and contacts 39$^a$ of relay 10$^a$ are closed the circuit of the closing coil 7$^c$ is from one side of the control circuit through contacts 39$^a$ of relay 10$^a$, auxiliary contacts 27$^b$ on switch 7$^b$, contacts 28$^b$ of relay 9$^b$, protective contacts 8$^c$, closing coil 7$^c$ to the other side of the control circuit.

When the source C is substituted for the source B it will be noted that the closing of the auxiliary contacts 40$^c$ of switch 2$^c$, which are in parallel with the contact 40$^b$ of switch 2$^b$, completes a circuit for the auxiliary winding 23$^a$ of current regulating relay 19$^a$ and that this circuit is completed until the output of the source C reaches a sufficient value to cause load responsive relay 24$^c$ to open its contacts 41$^c$. The opening of the auxiliary contacts 36$^c$ on the switch 2$^c$ also opens the circuit through the contacts 35$^a$ of relay 18$^a$ and the closing of auxiliary contacts 42$^c$ on the switch 2$^c$ completes a shunt circuit around contacts 33$^a$ of relay 18$^a$ so that control of the rheostat 14$^a$ is under the control of the current regulating relay 19$^a$. Therefore it will be noted that the output of the last source connected to the load circuit is normally controlled in response to the load circuit voltage and that the outputs of all of the other sources connected to the load circuit are controlled in response to their respective current outputs.

When the three sources A, B and C are connected to the load circuit and the output of the source C decreases below a predetermined value load responsive relay 24$^c$ closes its contacts 41$^c$ and 48$^c$.

Relays 24$^b$ and 24$^c$ are arranged in any suitable manner so that they close their respective contacts in response to a relatively lower current than the current required to open their contacts. Since the contacts 41$^b$ of load responsive relay 24$^b$ are open under the conditions assumed the closing of contacts 41$^c$ does not have any effect at this time, but the closing of contacts 48$^c$ closes the above described circuit for the auxiliary winding 23$^b$ so that current regulating relay 19$^b$ maintains the current output of the source B constant at a lower value.

When the current output of C remains for a predetermined time below a predetermined lower value than the value at which relay 24$^c$ closes its contacts, undercurrent relay 11$^c$ opens its contacts 29$^c$ in the holding circuit of the closing coil 7$^c$ so that switch 2$^c$ opens and disconnects the source C from the load circuit. The opening of the auxiliary contacts 46$^c$ and the closing of the auxiliary contacts 45$^c$ on the switch 2$^c$ restores the control of the rheostat 14$^b$ to the voltage relay 18$^b$ so that the excitation of source B is now varied to take care of the load variations of the load circuit.

When the current output of source B decreases below a predetermined value, load responsive relay 24$^b$ closes its contacts 41$^b$ so that auxiliary winding 23$^a$ of relay 19$^a$ is energized to decrease the output of the source A a predetermined amount. When the current output of source B remains for a predetermined time below a predetermined lower value than the value at which relay 24$^b$ closes its contacts, undercurrent relay 11$^b$ opens its contacts 29$^b$ in the holding circuit of the closing coil 7$^b$ so that switch 2$^b$ opens and disconnects the source B from the load circuit. The opening of the auxiliary contacts 42$^b$ and the closing of the auxiliary contacts 36$^b$ on the switch 2$^b$ restores the control of the rheostat 14$^a$ to the voltage relay 18$^a$ so that the excitation of source A is varied in response to load circuit voltage.

When the current output of source A remains for a predetermined time below a predetermined value undercurrent relay 11$^a$ opens its contacts 29$^a$ in the holding circuit of the closing coil 7$^a$ so that switch 2$^a$ opens and disconnects the source A from the load circuit.

With the arrangement shown it will be noted that if a large load is suddenly disconnected from the load circuit there is a possibility of a reversal of current occurring between the load circuit and the source whose output is being regulated in response to the voltage of the load circuit. This is due to the fact that the sources whose outputs are being maintained constant cause the load circuit voltage to increase above normal so that the excitation of the last connected source is reduced by its voltage regulating relay. If the decrease in the load is great enough, the voltage regulating relay will decrease the excitation of the last connected source sufficiently to cause the current to reverse through it before the associated underload relay 11 has time to operate and effect the disconnection thereof from the load circuit. In accordance with my invention I provide an arrangement which will effect a decrease in the output of one or more of the other sources whenever a current reversal occurs between any source and the load circuit. In the particular embodiment shown in the drawing I accomplish this result by arranging the apparatus so that whenever a current reversal occurs between any source and the load circuit the control of the rheostat 14 of the preceding source is restored to its associated voltage regulating relay 18. For example assume that sources A, B and C are connected to the load circuit and that the current between source C and the load circuit 1 reverses. This reversal of current causes current directional relay 20$^c$ to close its contacts 50$^c$ so that the associated control relay 21$^c$ is energized. Relay 21$^c$ by opening its contacts 47$^c$ opens the shunt circuit around contacts 33$^b$ and by closing its contacts 52$^c$ completes a shunt around the auxiliary contacts 45$^c$ on switch 2$^c$ in the circuit through contacts 35$^b$ of relay 18$^b$. The control of rheostat 14$^b$ is thereby restored to the voltage regulating relay 18$^b$ so that the output of the source B may be reduced to restore the load circuit voltage to normal. By opening its contacts 37$^c$ relay 21$^c$ prevents the rheostat 14$^c$ from being adjusted so as to prevent a decrease in the excitation of the source C while the reversal exists. Relay 21$^c$ by opening its contacts 43$^c$ opens the shunt circuit around the contacts 33$^a$ of relay 18$^a$ which was completed by the closing of auxiliary contacts 42$^c$ on switch 7$^c$. The opening of this shunt circuit at this time has no effect as there is still another shunt circuit around the contacts 33$^a$ through auxiliary contacts 42$^b$ on switch 2$^b$ and contacts 43$^b$ of relay 21$^b$. Relay 21$^c$ by closing its contacts 54$^c$ completes a shunt around the auxiliary contacts 36$^c$ on switch 2$^c$ in the circuit through contacts 35$^a$ of relay 18$^a$ but this circuit is still open at auxiliary contacts 36$^b$ on switch 2$^b$ and contacts 54$^b$ of relay 21$^b$. Therefore, when the source B is supplying current to the load circuit the operation of relay 21ᶜ does not restore the control of rheostat 14ᵃ to the voltage regulating relay 18ᵃ. If, however, the switch 2ᵇ were open it will be noted that the operation of relay 21ᶜ would restore the control of the rheostat 14ᵃ to the voltage regulating relay 18ᵃ.

If a reversal between source C and the load circuit should occur while the load circuit voltage is below normal, the excitation of the source C is increased to stop the reversal. This result is accomplished by having relay 21ᶜ also complete a circuit for the motor 15ᶜ through contacts 51ᶜ and contacts 33ᶜ of relay 18ᶜ.

When sources A and B are in service and a reversal occurs between source B and the load circuit, current directional relay 20ᵇ closes its contacts 50ᵇ, thereby effecting the energization of the associated control relay 21ᵇ. Relay 21ᵇ by closing its contacts 51ᵇ completes a circuit, through contacts 33ᵇ if the load circuit voltage is below normal, for the motor 15ᵇ so that the excitation of the source B is increased. By opening its contacts 37ᵇ the relay 21ᵇ prevents the rheostat 14ᵇ from being adjusted to decrease the excitation of the source B as long as the reversal exists.

Relay 21ᵇ by closing its contacts 54ᵇ and opening its contacts 43ᵇ restores the control of the rheostat 14ᵃ to the voltage regulating relay 18ᵃ so that the output of the source A is reduced to restore the load circuit voltage to normal and thereby stop the reversal through source B.

When a reversal occurs between the source A and the load circuit 1, reverse current relay 20ᵃ closes its contacts 50ᵃ and thereby effects the energization of relay 21ᵃ. Relay 21ᵃ by opening its contacts 37ᵃ prevents the rheostat 14ᵃ from being operated to decrease the excitation of the source A and by closing its contacts 51ᵃ completes a circuit for the motor 15ᵃ through the contacts 33ᵃ if the load circuit voltage is below normal, so that the rheostat 14ᵃ is adjusted to increase the excitation of the source A.

It will be noted therefore that whenever a reversal occurs between any source and the load circuit the regulating means of the preceding connected source is restored to the control of the associated voltage regulating relay.

While I have disclosed the regulating contacts associated with each source as being controlled by a separate relay in order to simplify the disclosure, in practice it is usually desirable to have all of these contacts controlled by a single relay which is responsive to the load circuit voltage so as to insure they are all operated simultaneously. Any suitable means examples of which are well known in the art may be provided for accomplishing this result.

While I have in accordance with the patent statutes, shown and described my invention as applied to a particular system and as embodying various devices diagrammatically indicated, changes and modifications will be obvious to those skilled in the art and I, therefore, aim in the appended claims to cover such changes and modifications as fall within the true spirit and scope of my invention.

What I claim as new and desire to secure by Letters Patent of the United States is:

1. In combination, a load circuit, a plurality of sources of current connected to said load circuit, means for maintaining the output of one of said sources constant at a predetermined value, and means responsive to a reversal of power between said load circuit and another of said sources for causing the output of said one of said sources to be controlled in response to the voltage of said load circuit.

2. In combination, a load circuit, a plurality of sources of current, means for connecting said sources to said load circuit in a predetermined sequence, regulating means associated with each source, control means responsive to a predetermined electrical condition of said circuit for controlling each regulating means, means responsive to the connection of any source to said load circuit for removing the control of the preceding sources in said predetermined sequence from the control of said control means, and means responsive to a power reversal between a source and the load circuit for restoring the control of the regulating means of the next preceding source to said control means.

3. In combination, a load circuit, a plurality of sources of current, means for connecting said sources to said load circuit in a predetermined sequence, regulating means associated with each source for controlling the output thereof, voltage responsive means for controlling the regulating means of said sources, means responsive to the connection of a source to said load circuit for removing the control of the regulating means of the preceding sources in said sequence from the control of said voltage responsive means, and means responsive to the flow of power from the load circuit to a source for restoring the control of the regulating means of the next preceding operating source in said sequence to said voltage responsive means.

4. In combination, a load circuit, a plurality of sources of current connected to said load circuit, means responsive to the voltage of said load circuit for controlling the output of one of said sources, means for maintaining the outputs of the other sources constant at predetermined values, and means responsive to a reversal of power between said load circuit and said one of said sources for causing the output of another of said sources to be controlled in response to the voltage of said load circuit.

5. In combination, a load circuit, a plurality of generators, means for connecting said generators to said circuit in a predetermined sequence, regulating means associated with each generator comprising a winding which when energized effects a decrease in the excitation of the associated generator and a second winding which when energized effects an increase in the excitation of the associated generator, control means responsive to an electrical condition of said circuit adapted to control the energization of the windings of said regulating means, and means dependent upon the direction of power flow between each generator and the load circuit for placing the winding of the regulating means associated with the preceding generator in said sequence under the control of said control means.

6. In combination, a load circuit, a plurality of sources of current, means for connecting said sources to said circuit in a predetermined sequence, regulating means associated with each source comprising a control winding which when energized effects an increase in the output of the associated source, control means responsive to a predetermined electrical condition of said load circuit for completing a circuit for each winding, and means for completing a circuit for each winding independently of said control means comprising means dependent upon the connection of a subsequent source in said sequence to said load circuit and the direction of power flow between said subsequently connected source and the load circuit.

7. In combination, a load circuit, a plurality of sources of current, means for connecting said sources to said circuit in a predetermined sequence, regulating means associated with each source comprising a control winding which when energized effects an increase in the output of the associated source, a circuit for each winding, series connected contacts in each circuit, means responsive to the voltage of said load circuit for closing certain of the contacts in each winding circuit when the load circuit voltage is less than a predetermined value, means responsive to a predetermined characteristic of the output of each source for closing other of the series connected contacts in the circuit of the associated winding, and means for completing a shunt around the contacts in each winding circuit which are controlled by said voltage responsive means comprising means responsive to the connection of a subsequent source in said sequence to said load circuit and means responsive to a predetermined direction of power flow between said subsequently connected source and the load circuit.

8. In combination, a load circuit, a plurality of sources of current, means for connecting said sources to said circuit in a predetermined sequence, regulating means associated with each source comprising a control winding which when energized effects an increase in the output of the associated source, a circuit for each winding, series connected contacts in each circuit, means responsive to the voltage of said load circuit for closing certain of the contacts in each winding circuit when the load circuit voltage is less than a predetermined value, means responsive to the current output of each source for closing other of the series connected contacts in the circuit of the associated winding when the output of a source is less than a predetermined value, and mean responsive to the connection of a source to said load circuit and to the flow of power from the source to the load circuit for completing a shunt circuit around the voltage controlled contacts of all of the winding circuits associated with the preceding sources in said sequence.

9. In combination, a load circuit, a plurality of sources of current, means for connecting said sources to said circuit in a predetermined sequence, regulating means associated with each source comprising a control winding which when energized effects a decrease in the output of the associated source, and means dependent upon a predetermined electrical condition of said load circuit and the disconnection of all of the subsequent sources in said sequence from said load circuit for completing a circuit for each control winding.

10. In combination, a load circuit, a plurality of sources of current, means for connecting said sources to said circuit in a predetermined sequence, regulating means associated with each source comprising a control winding which when energized effects a decrease in the output of the associated source, and means dependent upon a predetermined electrical condition of said load circuit and a power reversal between the load circuit and a subsequent source in said sequence for completing a circuit for each control winding.

11. In combination, a load circuit, a plurality of sources of current, means for connecting said sources to said circuit in a predetermined sequence, regulating means associated with each source comprising a control winding which when energized effects a decrease in the output of the associated source, a circuit for each winding, series connected contacts in each winding circuit, means responsive to the voltage of said load circuit for closing certain of the series connected contacts in each winding circuit when the load circuit voltage is above a predetermined value, and means responsive to the connection of a source to the load circuit for opening other of the series connected contacts in each of the winding circuits associated with the preceding sources in said sequence.

12. In combination, a load circuit, a plurality of sources of current, means for connecting said sources to said circuit in a predetermined sequence, regulating means associated with each source comprising a control winding which when energized effects a decrease in the output of the associated source, a circuit for each winding, series connected contacts in each winding circuit, means responsive to the voltage of said load circuit for closing certain of the contacts in each winding circuit when the load circuit voltage is above a predetermined value, and means responsive to a reversal of power between the load circuit and a source for closing certain of the contacts in each of the winding circuits associated with the preceding sources in said sequence.

13. In combination, a load circuit, a plurality of sources of current, means for connecting said sources to said circuit in a predetermined sequence, regulating means associated with each source comprising a control winding which when energized effects a decrease in the output of the associated source, a circuit for each winding, series connected contacts in each winding circuit, means responsive to the voltage of said load circuit for closing certain of the contacts in each winding circuit when the load circuit voltage is above a predetermined value, and means responsive to the connection of a source to the load circuit for opening certain of the contacts in each of the winding circuits associated with the preceding sources in said sequence, and means responsive to a reversal of power between the load circuit and a source for completing a shunt circuit around the contacts in the winding circuits which are opened in response to the connection of the source to the load circuit.

14. In combination, a load circuit, a plurality of sources of current, means for connecting said sources to said load circuit in a predetermined sequence, regulating means associated with each source comprising a plurality of control circuits, contacts in each control circuit, control means responsive to a predetermined electrical condition of said load circuit for controlling certain of the contacts in each control circuit, and means responsive to the connection of each source to the load circuit for controlling other of said contacts in the control circuits associated with the preceding sources in said sequence so that said last mentioned control circuits may be controlled independently of the operation of said control device.

15. In combination, a load circuit, a plurality of sources of current, means for connecting said sources to said load circuit in a predetermined sequence, regulating means associated with each source comprising a control winding which when energized effects a decrease in the output of the associated source, a circuit for each winding, series connected contacts in each winding circuit, means responsive to a predetermined electrical condition of said load circuit for controlling certain of the contacts in each winding circuit, and means responsive to the connection of each source to the load circuit for opening other of the series connected contacts in each of the winding circuits associated with the preceding sources in said sequence.

16. In combination, a load circuit, a plurality of sources of current, means for connecting said sources to said load circuit in a predetermined sequence, regulating means associated with each source comprising a control winding which when energized effects an increase in the output of the associated source, a circuit for each winding, parallel connected contacts in each winding circuit, means responsive to a predetermined electrical condition of said load circuit for controlling certain of the parallel connected contacts in each winding circuit, and means responsive to the connection of each source to the load circuit for controlling other of the parallel connected contacts in each of the winding circuits associated with the preceding sources in said sequence.

In witness whereof, I have hereunto set my hand this 17th day of January, 1928.

HERMAN BANY.